June 8, 1965   J. L. NIXON   3,188,134
AUTOMOBILE SEAT CONVERTIBLE TO BED
Filed June 24, 1963   2 Sheets-Sheet 1
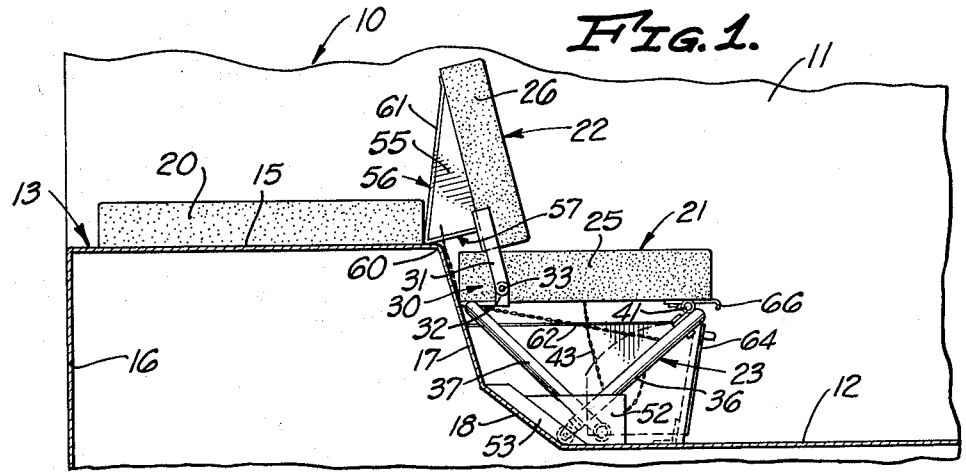//FIG. 1.
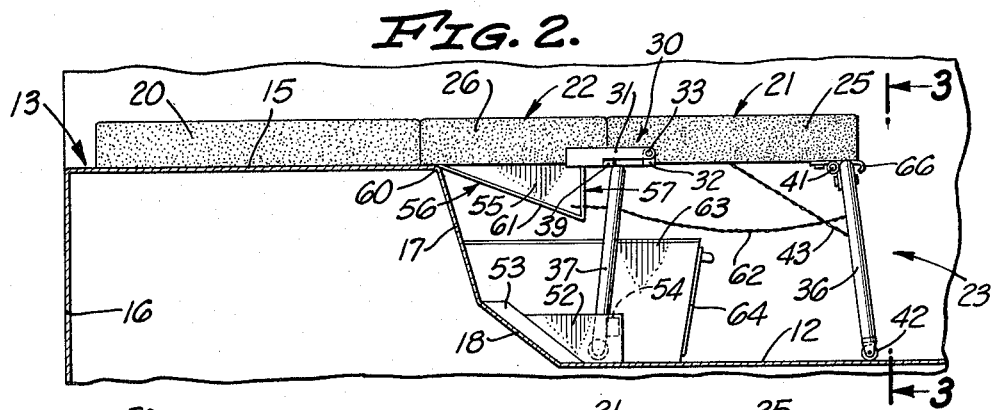//FIG. 2.
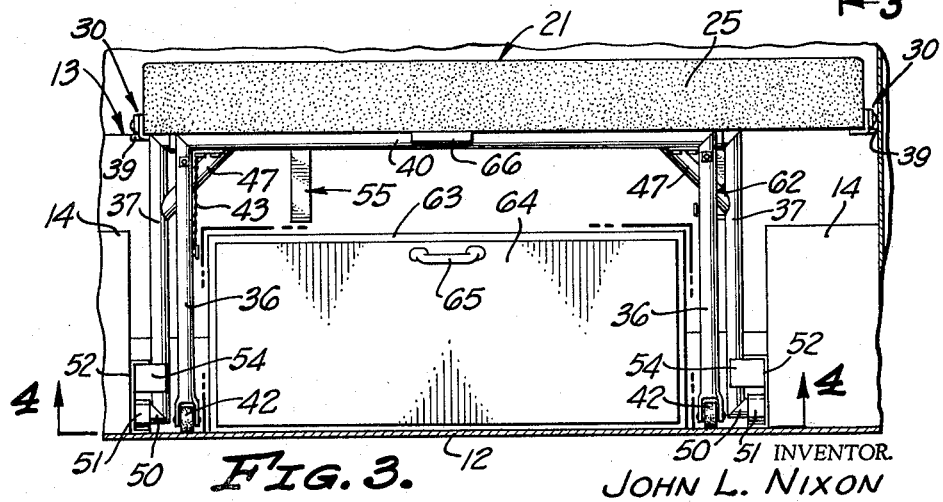//FIG. 3.
INVENTOR.
JOHN L. NIXON
BY Herbert E. Fidder
AGENT June 8, 1965  J. L. NIXON  3,188,134
AUTOMOBILE SEAT CONVERTIBLE TO BED
Filed June 24, 1963  2 Sheets-Sheet 2
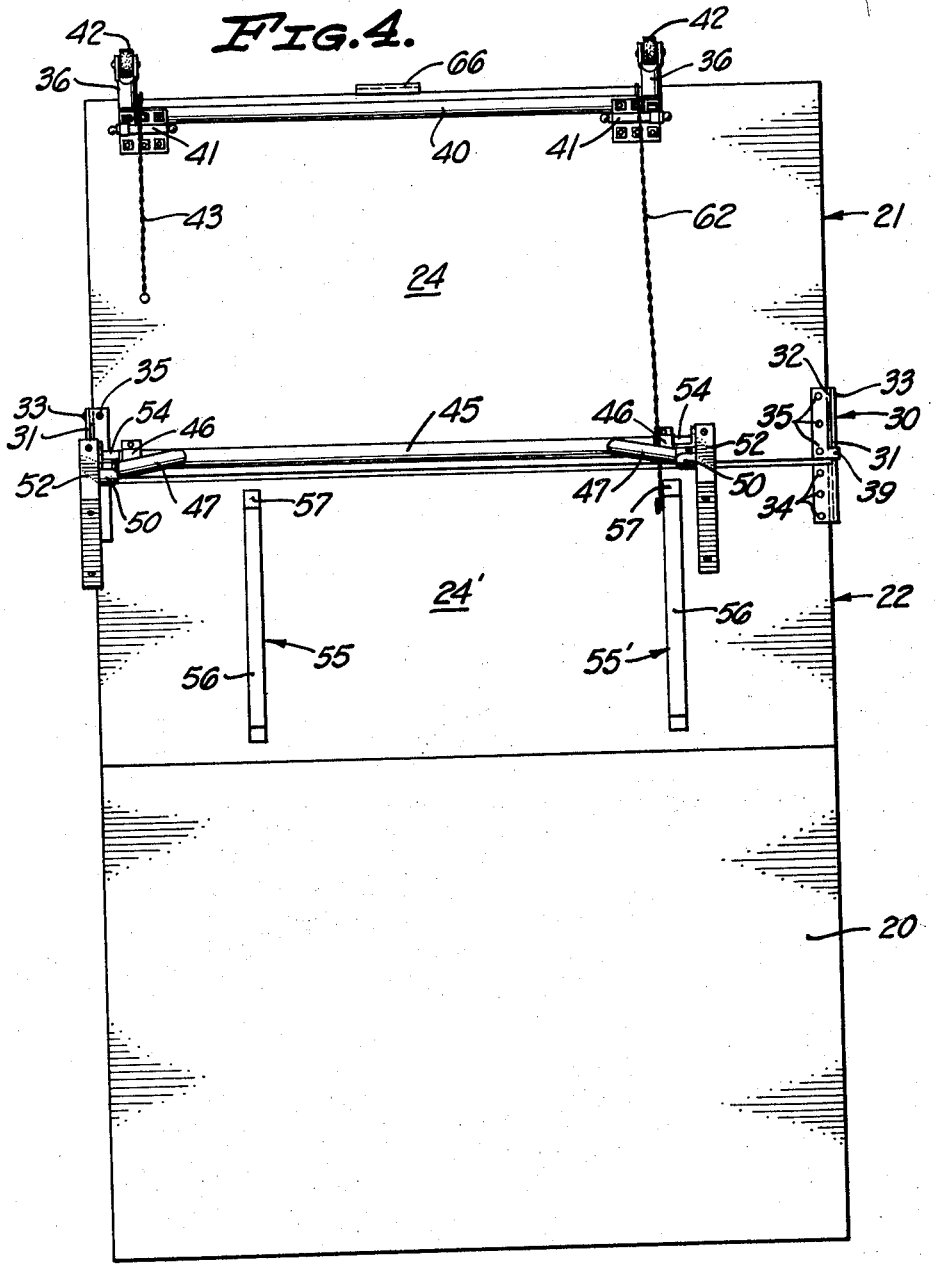
INVENTOR.
JOHN L. NIXON
BY Herbert E. Kidder
AGENT

United States Patent Office 3,188,134
Patented June 8, 1965

3,188,134
AUTOMOBILE SEAT CONVERTIBLE TO BED
John L. Nixon, 5086 N. Hedrick, Arlington, Calif.
Filed June 24, 1963, Ser. No. 289,819
7 Claims. (Cl. 296—69)

The present invention relates to an automobile seat convertible into a bed, and more particularly to a construction of this nature which permits conversion of certain panel trucks or similar models, so that they may be used either as a station wagon or as a camper. The term "camper" as used herein, designates automotive vehicles having built-in beds and other living accommodations permitting the vehicle to be used as a mobile home while camping or traveling cross-country.

Both the station wagon and the camper have achieved widespread popularity because of their utility and versatility, and as a result most of the standard size makes of passenger automobiles include station wagon models and pick-up trucks styled to receive a camper body. However, this trend does not extend to all of the smaller size, foreign-made lines of automobiles, nor to certain "compact" models made in the United States.

To remedy this situation, there have been many attempts to convert certain models of these smaller size automobiles into campers, and one of the most popular models for such conversion work is the German-made Volkswagen panel truck. Being a rear-engine automobile, the Volkswagen presents certain difficulties owing to the presence of an elevated platform in the rear end of the panel truck body, forming the compartment in which the engine and transmission are housed. This elevated platform occupies roughly one-third the length of the body behind the driver's seat, and while the height of the platform is acceptable for the purpose of a bed when covered by a suitable mattress cushion, it is about 4 inches too high for use as a seat. There is not enough room in the vehicle for both a bed and a separate seat, and the primary object of the invention, therefore, is to provide a comfortable seat of normal seat level, which can be converted instantly into a bed when combined with the mattress cushion on the platform.

Another object of the invention is to provide means for converting a panel truck of the class described, so as to obtain the seating and load-carrying capacity of a station wagon, combined with the living accomodations of a camper.

A further object of the invention is to provide a convertible seat/bed which is manually operable and requires no motor driven apparatus. Moreover, the convertible seat/bed of the invention is quick and effortless in operation, easily installed and attractively styled. Other advantages of the invention are that it is simple in construction, sturdy, trouble-free, and low in manufacturing cost.

These objects are achieved by a novel seat construction in which the seat bottom is mounted on front and rear support legs that are swingably connected to the underside of the seat bottom adjacent the front and rear edges thereof. The rear support legs are pivotally connected at their bottom ends to suitable brackets on the floor, while the front support legs have rollers at their bottom ends that run on the floor. When the seat bottom is lowered to the seat level position, the front and rear legs fold together so that their bottom ends are crossed, and when the seat bottom is raised to the bed position, the legs stand substantially vertical.

The seat back is pivoted to the seat bottom and swings up to a slightly inclined, upright position, or down to a horizontal bed position. In the latter position, the seat back cushion fits snugly betwen the back edge of the seat bottom cushion and the front edge of the mattress cushion on the platform, so that the three cushions together form a continuous level surface for sleeping, without any gaps between them. The back is braced directly against the engine compartment platform by means of members attached to the rear side thereof, and these members have inclined cam surfaces that slidably engage the front top edge of the platform to bring the back to the upright position for the seat.

Because of the geometry of these components, no hook or catch is necessary to hold the apparatus, in either the seat or bed position. The weight of the person sitting on the seat or lying on the bed, exerts a positive locking force on the apparatus, tending to hold it in the selected position. All that is required to make the bed is a simple, short pull on the handle on the front of the seat. To remake it into a seat, a slight downward push and then a rearward shove is sufficient. The front legs roll out automatically for the bed position and tuck themselves back under for the seat position.

The foregoing and other objects and advantages of the present invention will become apparent to those skilled in the art upon consideration of the following detailed description of the preferred embodiment thereof, reference being had to the accompanying drawings, wherein:

FIGURE 1 is a fragmentary sectional view through the rear end portion of a Volkswagen panel truck body, showing the apparatus of the present invention set up as a seat;

FIGURE 2 is a similar view, showing the apparatus set up as a bed;

FIGURE 3 is a front elevational view of the same, to a slightly larger scale, as seen at 3—3 in FIGURE 2; and FIGURE 4 is a view of the underside of the bed, as seen at 4—4 in FIGURE 3.

In the drawings, the reference numeral 10 designates the body of a Volkswagen panel truck, of which the only parts illustrated are the side walls 11, floor 12, rear engine compartment 13 and rear wheel wells 14. The engine compartment 13 consists of a horizontal top 15, hereinafter referred to as a "platform," a rear wall 16, and front wall 17, the lower portion 18 of which is inclined forwardly somewhat more than the upper portion. Resting on top of platform 15 is a mattress cushion 20, preferably of foam rubber about 4 inches thick.

The apparatus of the invention comprises a cushioned seat bottom 21, cushioned seat back 22, and supporting structure 23. Both the bottom 21 and back 22 consist of plywood panels 24 and 24' (FIGURE 4), to which 4-inch thick foam rubber cushions 25 and 26 are suitably attached. The seat cushions 25 and 26, and mattress cushion 20 are preferably covered with the same fabric as that used on the driver's seat for decorative harmony.

The seat back 22 is swingably connected to the seat bottom 21 adjacent the rear edge of the latter by means of two hinges 30, each of which consists of a hinge arm 31, bracket 32, and connecting pivot pin 33. The hinge arm 31 is connected by screws 34 to the plywood panel 24' of the seat back 22 adjacent the bottom edge thereof, and the arms 31 project beyond the edge of the plywood panel for a distance approximately equal to the thickness of the seat cushion 25. The outer ends of the arms 31 are connected by the pivot pins 33 to brackets 32, and the latter are connected by screws 35 to the plywood panel 24 of the seat bottom 21. A limit stop 39 projects laterally from the bracket 32 near the back edge of the panel 24 and engages the arm 31 to prevent the same from swinging below the position shown in FIGURE 2.

By virtue of this hinge arrangement, the seat back 22 swings up to the upright position shown in FIGURE 1, with the bottom edge of the cushion 26 clear of the cushion 25, and well forward of the back edge thereof. This makes possible the use of a wide seat cushion 25 in order to obtain the desired overall bed length, and by bringing the seat back 22 forwardly of the back edge of the cushion, the apparent front-to-back depth of the cushion 25 is reduced to a normal dimension for sitting comfort. At the same time, the hinge geometry causes the bottom edge of the seat back cushion 26 to fit snugly against the rear edge of the seat bottom cushion 25, so that the two cushions 25, 26 provide a continuous mattress cushion, without any gaps therebetween.

The supporting structure 23 comprises front support legs 36 and rear support legs 37, each made of tubular steel and having the configuration of an inverted U. The horizontal midsection 40 of the front support legs 36 lies closely against the plywood panel 24, parallel to the front edge thereof, and is pivotally attached thereto by two spring hinges 41. The spring hinges 41 are of the same type as those used on screen doors, garden gates, and the like, and they contain a spring (not shown) which exerts a yielding, spring pressure against the legs 36, urging them forwardly. The bottom ends of the legs 36 are bifurcated to receive rollers 42, which rest on the floor 12 and roll in the fore and aft direction thereon.

The legs 36 swing between the downwardly and rearwardly inclined position shown in FIGURE 1, and the downwardly and slightly forwardly inclined position shown in FIGURE 2. A chain 43, which is attached at one end to the right-hand leg 36 and at the other end to the plywood panel 24 near the center-line thereof, stops the legs at the position shown in FIGURE 2, which is just past center with respect to the vertical, so that the weight of a person sitting on the seat bottom 21 causes the legs 36 to exert a forward pull against the chain 43.

The horizontal midsection 45 of the U-shaped rear support legs 37 lies closely against the plywood panel 24, adjacent and parallel to the back edge thereof. The midsection 45 is pivotally attached to the plywood panel 24 by the two U-shaped bearing straps 46, which allow the legs 37 to swing between the downwardly and forwardly inclined position shown in FIGURE 1 to the substantially vertical position shown in FIGURE 2. Diagonal braces 47 serve to brace the legs 37 with respect to the horizontal midsection 45.

The bottom ends of the legs 37 are turned laterally outwardly at 50, and are journaled in bearings 51 that are mounted on brackets 52. The brackets 52 are attached to the floor 12 and to a wood spacer block 53, which is screwed to the inclined lower portion 18 of the front side of the engine compartment. A limit stop plate 54 projects laterally inward from the inside face of the bracket 52 and engages the leg 37 to stop the same at the vertical position shown in FIGURE 2.

Mounted on the rear side of the plywood panel 24' (the seat back) and projecting perpendicularly therefrom, are two laterally spaced, triangularly-shaped members 55 and 55'. The members 55 and 55' are preferably formed of wood, and each is provided with an inclined ramp edge 56 and a bottom edge 57, the latter being substantially perpendicular to the panel 24'.

The inclined ramp edges 56 slidably engage the top front corner 60 of the engine compartment 13 to raise the seat back 22 to the upright position when the seat bottom 21 is pushed rearwardly from the position shown in FIGURE 2, to the position shown in FIGURE 1. As the seat back approaches its upright position, the bottom corners of the members 55, 55' slip up over the top front corner 60 and rest upon the platform 15, where they serve to brace the seat back. In like manner, the members 55, 55' lower the seat back 22 gently to the horizontal position when the seat bottom is pulled forwardly. The edges 56 and 57 of the members 55 and 55' are overlaid with metal strips 61, which take the wear due to sliding over the corner 60. A leg retractor chain 62 is connected between the left front leg 36, and the adjacent member 55', and serves to pull the front leg rearwardly as the seat back 22 is raised up to the upright position by the members 55, 55'.

When the apparatus is in the seat position shown in FIGURE 1, the front edge of the seat bottom is supported on a sturdy, built-in storage box 63 beneath the seat, upon which the horizontal midsections 40 and 45 of the legs rest, while the rear edge of the seat bottom abuts against the front wall 17 of the engine compartment. The storage box 63 has a tilt-out bin 64 on the front side thereof, with a handle 65, and bedding or other articles may be stored here. Due to the inclination of the rear legs 37, the weight of a person sitting on the cushion 25 causes a rearward and downward thrust to be exerted against the seat bottom. However, rearward movement of the seat bottom is prevented by the abutment of its rear edge against the wall 17. Thus, the person's weight is transmitted as a compression force through the legs 37 to the floor 12, and as a rearward pressure against the wall 17. The seat is thus forcibly urged into its seat position by the person's weight, and no locks are required to prevent it from collapsing or shifting to another position.

The operation of the invention is believed to be self-evident from the foregoing description. Normally, the apparatus will be set up in the seat condition, as shown in FIGURE 1, which gives the vehicle the passenger-seating capacity of a two-seat station wagon. To make up the bed, the seat bottom 21 is pulled forwardly, using a handle 66 on the front edge thereof, which is provided for that purpose. As the corners of the members 55 pass over the top front corner of the platform 15, the seat back 22 starts to fold down rearwardly, which releases the leg retractor chain 62 and allows the spring hinges 41 to swing the front legs 36 forwardly. At the same time, the rear legs 37 swing forwardly and upwardly about the pivots 50, raising the rear edge of the seat bottom 21. As the front and rear support legs reach the substantially vertical position shown in FIGURE 2, the seat bottom 21 is elevated so that the top of the cushion 25 is level with the top of the mattress cushion 20. The seat back 22 is also down to the horizontal position and the cushion 26 fits snugly between the cushions 20 and 25, and is level with both of them. The three cushions 20, 26 and 25 thus form a flat, continuous surface for sleeping, with no gaps between the cushions.

To convert the bed back to a seat, the handle 66 is given a slight downward push and then a rearward shove. At the moment the handle 66 is given a downward push, the front legs 36 are nudged rearwardly so that they swing to the rear of vertical, and this allows the front edge of the seat bottom 21 to yield downwardly. The limit stops 39 on the hinges 30 pick up the hinge arms 31 and raise the rear edge of the seat back 22 until it clears the cushion 20. The rearward shove on the handle 66 then causes the seat bottom 21 to move rearwardly as the rear legs 37 swing about their pivots 50. The inclined edges 56 of the members 55, 55' engage and slide up over the corner 66, raising the seat back 22 to the upright position. At the same time, the leg retractor chain 62 pulls the front legs 36 rearwardly against the spring tension of the spring hinges 41, and tucks them back under the seat.

While I have shown and described in considerable detail what I believe to be the preferred embodiment of my invention, it will be understood by those skilled in the art that various changes may be made in the shape and arrangement of the several parts without departing from the broad scope of the invention as described in the following claims.

I claim:

1. In an automobile having a body with a raised platform at the rear end of the interior thereof, a rear seat convertible into a bed, comprising:

a cushion resting on top of said raised platform;

a cushioned seat bottom carried on adjustable support means;

said adjustable support means being operable to move said seat bottom between a first position wherein the seat bottom is located at normal seat level with its rear edge abutting against the front side of said raised platform, and a second position wherein the seat bottom is elevated so that the top of the seat cushion is substantially level with the top of said cushion on said platform, and the rear edge of the seat bottom is spaced forwardly from the front side of said platform;

a cushioned seat back hinged to said seat bottom for vertical swinging movement between an upwardly and rearwardly inclined first position and a horizontal second position; and means for moving said seat back to said first position responsive to movement of said seat bottom from its second position to its first position, said means comprising a cam member mounted on the rear of said seat back and cooperating with said raised platform when said seat bottom is moved between its first and second positions, to shift said seat back to the corresponding position;

said seat back being disposed, when in said second position, to fill the space between the front side of said platform and the rear edge of said seat bottom, and the top of the seat back cushion being flush with the tops of said seat bottom cushion and said cushion on said platform.

2. In an automobile having a body with a raised platform at the rear end of the interior thereof, a rear seat convertible into a bed, comprising:

a cushion resting on top of said raised platform;

a cushioned seat bottom;

front support legs pivotally connected to said seat bottom near the front edge thereof;

rear support legs pivotally connected to said seat bottom near the back edge thereof;

said front and rear support legs being swingable to raise said seat bottom from a first position at normal seat level with its rear edge substantially abutting against the front side of said raised platform, to a second position wherein the top of the seat cushion is level with the top of said cushion on said platform and the rear edge of the seat bottom is spaced forwardly from the front side of the platform;

a cushioned seat back hinged to said seat bottom for vertical swinging movement between an upwardly and rearwardly inclined first position and a horizontal second position;

means comprising at least one cam member mounted on the rear of said seat back and slidably engaging the top front corner of said raised platform when said seat bottom is moved between its first and second positions, to shift said seat back to the corresponding position; and leg retractor means connecting said front support legs to said seat back, whereby upward swinging movement of said seat back with respect to said seat bottom causes said front legs to be swung rearwardly so that the lower ends of said front legs are tucked under the seat bottom;

said seat back being disposed, when in said second position, to fill the space between the front side of said platform and the rear edge of said seat bottom, and the top of the seat back cushion being flush with the tops of said seat bottom cushion and said cushion on said platform.

3. In an automobile having a body with a raised platform at the rear end of the interior thereof, a rear seat convertible into a bed, comprising:

a cushion resting on top of said raised platform;

a cushioned seat bottom disposed ahead of said platform;

front support legs pivotally connected to said seat bottom near the front edge thereof, the bottom ends of said front support legs resting on the floor of the automobile body and being movable with respect thereto between a rearward position and a forward position;

rear support legs pivotally connected to said seat bottom near the rear edge thereof, the bottom ends of said rear support legs being pivotally connected to said automobile body for swinging movement between a rearward position and a forward position;

said front and rear support legs being operable, when at their respective rearward positions, to support said seat bottom at a first position wherein the seat bottom is located at a normal seat level with its rear edge substantially abutting against the front edge of said raised platform;

said front and rear support legs being operable, when at their respective forward positions, to support said seat bottom at a second position wherein the seat bottom is elevated so that the top of the seat cushion is substantially level with the top of said cushion on said platform, and the rear edge of the seat bottom is spaced forwardly from the front side of said platform;

a cushioned seat back hinged to said seat bottom adjacent the rear edge thereof, for swinging movement between an upwardly and rearwardly inclined first position, and a horizontal second position level with said seat bottom and abutting against the rear edge thereof; and means for raising said seat back from said second position to said first position responsive to the movement of said seat bottom from its second position to its first position, said means comprising at least one cam member mounted on the rear of said seat back and slidably engaging the top front corner of said raised platform when said seat bottom is moved from its first position to its second position, said cam member bearing upon said platform when said seat back is in said first position to brace the seat back;

said seat back filling the space between the front of said platform and the rear edge of said seat bottom when in said second position.

4. In an automobile having a body with a raised platform at the rear end of the interior thereof, a rear seat convertible into a bed, comprising:

a cushion resting on top of said raised platform;

a cushioned seat bottom movable between a first position wherein the seat bottom is located at normal seat level with its rear edge abutting against the front side of said raised platform, and a second position wherein the seat bottom is elevated so that the top of the seat cushion is substantially level with the top of said cushion on said platform, and the rear edge of the seat bottom is spaced forwardly from the front side of said platform;

supporting means attached to the underside of said seat bottom and bearing on a horizontal surface of said body, and movable with respect thereto in the fore- and aft direction as said seat bottom moves from said first position to said second position, said supporting means providing support for the forward portion of said seat bottom when the latter is at said second position;

a cushioned seat back hinged to said seat bottom for vertical swinging movement between an upwardly and rearwardly inclined first position and a horizontal second position; and a cam member mounted on the rear of said seat back and cooperating with said raised platform when said seat bottom is moved between its first and second positions, to shift said seat back to the corresponding position;

said seat back being disposed, when in said second position, to fill the space between the front side of said platform and the rear edge of said seat bottom, and the top of the seat back cushion being flush with the tops of said seat bottom cushion and said cushion on said platform.

5. In an automobile having a body with a raised platform at the rear end of the interior thereof, a rear seat convertible into a bed, comprising:

a cushion resting on the top of said raised platform;

a cushioned seat bottom disposed ahead of said platform and movable with respect thereto between a first position wherein the seat bottom is located at a normal seat level with its rear edge substantially abutting against the front side of said raised platform, and a second position wherein the seat bottom is elevated so that the top of the seat cushion is substantially level with the top of said cushion on said platform, and the rear edge of the seat bottom is spaced forwardly from the front side of said platform;

rear support legs pivotally connected to said seat bottom near the rear edge thereof, the bottom ends of said rear support legs being pivotally connected to said automobile body for swinging movement between a rearward position and a forward position;

supporting means mounted on the underside of said seat bottom and bearing on a horizontal surface of said automobile body, said supporting means being movable on said horizontal surface in the fore-and-aft direction as said seat bottom moves from said first position to said second position, said rear support legs and said supporting means providing support for said seat bottom when the latter is at said second position;

a cushioned seat back hinged to said seat bottom adjacent the rear edge thereof, for swinging movement between an upwardly and rearwardly inclined first position, and a horizontal second position level with said seat bottom and abutting against the rear edge thereof; and a cam member mounted on the rear of said seat back and slidably engaging the top front corner of said raised platform when said seat bottom is moved from its first position to its second position, to raise said seat back from said second position to said first position responsive to movement of said seat bottom from its second position to its first position, said cam member bearing on said platform when said seat back is in its first position to brace the seat back;

said seat back filling the space between the front of said platform and the rear edge of said seat bottom when in said second position.

6. In an automobile having a body with a raised platform at the rear end of the interior thereof, a rear seat convertible into a bed, comprising:

a cushion resting on the top of said raised platform;

a cushioned seat bottom disposed ahead of said platform;

front support legs swingably connected to said seat bottom near the front edge thereof, the bottom ends of said front support legs having rollers that run in the fore and aft direction on the floor of the automobile body;

spring means yieldingly urging said front support legs forwardly;

means for limiting the forward swinging movement of said front support legs;

rear support legs swingably connected to said seat bottom near the rear edge thereof, the bottom ends of said rear support legs being pivotally connected to said automobile body for fore and aft swinging movement to a vertical plane;

said front and rear support legs being operable to carry said seat bottom between a first position wherein said seat bottom is located at a normal seat level with its rear edge abutting against the front side of said raised platform, and a second position wherein the seat bottom is elevated so that the top of the seat cushion is substantially level with the top of the cushion on said platform, and the rear edge of the seat bottom is spaced forwardly from the front side of said platform;

a cushioned seat back hinged to said seat bottom adjacent the rear edge thereof for swinging movement between an upwardly and rearwardly inclined first position and a horizontal position level with said seat bottom and abutting against the rear edge thereof;

a cam member mounted on the rear of said seat back and slidably engaging the top front corner of said raised platform when said seat bottom is moved between its first and second positions, to shift said seat back to the corresponding position; and leg retractor means connecting said front support legs to said cam member, whereby said front legs are folded rearwardly when said seat bottom is moved from said second position to said first position.

7. A rear seat convertible into a bed, as in claim 6, wherein means is provided for additionally supporting the front edge of said seat bottom, said supporting means comprising a storage box mounted on the floor of the automobile beneath said seat bottom and operable to engage and support the front edge of the seat bottom when the latter is in the seat position.

References Cited by the Examiner

UNITED STATES PATENTS

| 2,044,334 | 6/36 | Shrewsbury | 297—191 |
| 2,347,025 | 4/44 | Benzick | 296—69 X |

FOREIGN PATENTS

| 206,141 | 11/59 | Austria. |
| 593,283 | 10/47 | Great Britain. |

A. HARRY LEVY, *Primary Examiner.*